United States Patent Office 3,275,028
Patented Sept. 27, 1966

3,275,028
NON-RETURN VALVE ARRANGEMENT
FOR PIPE-LINES
Karl Reppert and Erich Konrad, Zweibrucken, Germany, assignors to Dinglerwerke Aktiengesellschaft, Zweibrucken, Germany
Filed June 13, 1963, Ser. No. 287,707
Claims priority, application Germany, June 15, 1962,
D 24,968
2 Claims. (Cl. 137—527.6)

Our invention has for its object a non-return flap valve arrangement for pipe lines, said arrangement including a body constituted by two sections interconnected by flanges extending perpendicularly to the axis of the pipes forming the pipe line, one of said sections being provided with an annular packing fitted thereon, while the other section is provided with the actual flap valve member pivotally secured to said section and adapted to collapse in its open position inside a lateral recess formed in said other section, while said flap valve is bounded by a surface facing the inside of the pipe line in said open position and extending then entirely outside the cross-section of the pipe line. Our invention consists thus in that said non-return valve member may be shifted out of its closed position preventing the passage of fluid through the pipe line into an open position extending completely outside the cross-sectional outline of said pipe line, so that the fluid medium may sweep freely over the valve in its open condition in either direction without subjecting said valve to any turbulence.

Our invention allows thus executing a pipe incorporating a non-return valve which allows an easy brushing out.

The surface limiting the valve member and extending for the open position of the later outside the cross-sectional area of the pipe, may thereby match the shape of a brush adapted to sweep the pipe line as provided by the presence of rounded guiding projections raised on the valve member, the cross-section of which is that of a cap, whereby the idle space to either side is also reduced to a minimum value.

We have illustrated by way of example in the accompanying drawing, a preferred embodiment of our invention. In said drawing.

Figure 1:
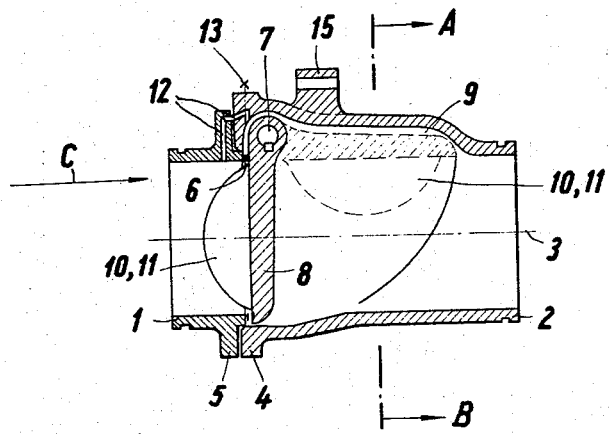
FIG. 1 is a vertical cross-section through said non-return valve arrangement.

The valve body to be incorporated with the pipe line includes two sections 1 and 2 interconnected through their flanges 4 and 5 extending perpendicularly to the axis of the pipe line considered. In the interchangeable section 1 of the valve casing is inserted, adjacent the flange 5, an annular packing 6. The actual valve member 8 pivotally secured to the edge of the second section 2 of the casing 2 at 7 is illustrated in solid lines in FIG. 1 in its closed condition and it may be shifted into its open condition illustrated in interrupted lines in FIG. 1 and for which it recedes inside a lateral recess 9 formed in the periphery of the casing section 2. The cross-section of the valve member is that of a cap the lower surface of which carries rounded guiding projections 10 and 11 which for the open position of the valve define the cross-section of the pipe line through which fluid flows in the direction of the arrow C so that the shape of the valve member matches the inner shape of the pipes.

Inside the flanges 4 and 5 are provided bores 12 which provide for valve equilibrium in the closed position which may be controlled by the adjusting screw 13.

Figure 3:
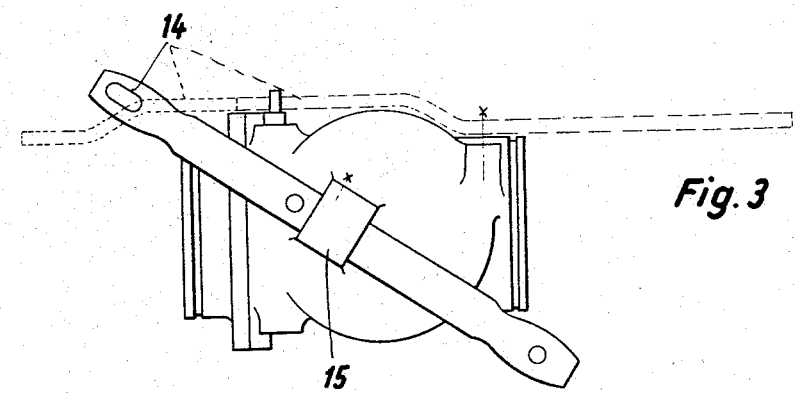
FIG. 3 is a view from above of the return valve arrangement illustrated in FIG. 1.
Figure 2:
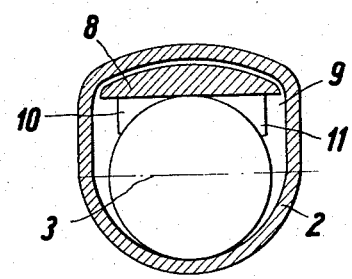
FIG. 2 is a cross-section through line A–B of FIG. 1.

The valve member 8 may be held in a balanced condition by a lever 14 in the usual manner, as illustrated by dotted lines in FIG. 3, or else, it may be secured through said lever as illustrated by the interrupted lines in FIG. 3. The lever 14 may also be introduced into the projection or boss 15 on the casting section 2 so as to serve as illustrated by solid lines in FIG. 3 as a carrier handle for the valve.

Our invention provides thus a simple non-return valve of a reduced bulk which is easy to operate and which is particularly suitable for the connection of pipes to be assembled speedily and often only transiently for a short time.

What we claim is:

1. A non-return valve comprising a casing having a straight flow path therethrough, said casing comprising two axially aligned sections, flange joint means detachably connecting said sections, an annular valve seat on one section adjacent said joint, the other section having a recess at one side opening into said path, a transverse shaft rotatably mounted in said other section and projecting into said recess adjacent said joint, a flapper valve member fixed to said shaft and movable into engagement with said seat to close said flow path, said valve member being movable into and substantially filling said recess to provide an unobstructed flow path through said casing, a valve control lever removably received on said shaft exteriorly of said casing, and an exterior boss on one of said sections, said boss having an aperture therethrough, whereby upon removal of said lever from said shaft, said lever may be passed through said aperture to provide a handle for carrying said valve.

2. A valve as defined in claim 1 in which said valve member is provided with diametrically disposed inwardly extending projections, the inner surface of said projections being arcuate and of a radius substantially conforming to the radius of said flow path, whereby with said valve member in open position a flow path through said casing of substantially uniform circular cross section is provided.

References Cited by the Examiner

UNITED STATES PATENTS

| 695,046 | 3/1902 | Granton | 251—298 X |
|---|---|---|---|
| 886,208 | 4/1908 | Hadley | 251—291 X |
| 1,647,036 | 10/1927 | Dileo | 251—298 |
| 2,703,582 | 3/1955 | Stepanian | 137—51.35 X |
| 2,834,369 | 5/1958 | Wheeler | 251—291 X |
| 2,852,037 | 9/1958 | Downing et al. | 251—298 X |
| 2,969,492 | 1/1961 | Wheatley | 137—242 X |
| 3,038,494 | 6/1962 | Gulick | 137—242 X |
| 3,053,278 | 9/1962 | Verheul | 251—298 X |

FOREIGN PATENTS

| 1,269,634 | 7/1961 | France. |
|---|---|---|
| 1,305,084 | 8/1962 | France. |
| 662,653 | 12/1951 | Great Britain. |

M. CARY NELSON, *Primary Examiner.*

S. SCOTT, *Assistant Examiner.*